United States Patent
Prasad (10) Patent No.: US 10,469,725 B2
(45) Date of Patent: Nov. 5, 2019

(54) SPATIOTEMPORAL REGISTRATION OF IMAGE STREAMS

(71) Applicant: ROLLS-ROYCE PLC, London (GB)

(72) Inventor: Dilip K Prasad, Derby (GB)

(73) Assignee: ROLLS-ROYCE plc, London (GB)

(*) Notice: Subject to any disclaimer, the term of this patent is extended or adjusted under 35 U.S.C. 154(b) by 61 days.

(21) Appl. No.: 15/700,501

(22) Filed: Sep. 11, 2017

(65) Prior Publication Data

US 2018/0084226 A1 Mar. 22, 2018

(30) Foreign Application Priority Data

Sep. 16, 2016 (GB) ...................................... 1615776

(51) Int. Cl.
*H04N 5/232* (2006.01)
*G06T 7/32* (2017.01)
(Continued)

(52) U.S. Cl.
CPC .............. *H04N 5/232* (2013.01); *G06T 7/194* (2017.01); *G06T 7/32* (2017.01); *G06T 7/38* (2017.01);
(Continued)

(58) Field of Classification Search
CPC ......... G06T 7/38; G06T 7/194; G06T 3/0075; G06T 3/0081; G06T 3/0087; G06T 2207/10021; G06T 7/30; G06T 3/0068–0081; G06T 2207/10016; H04N 5/2258; H04N 5/247; H04N 7/181;
(Continued)

(56) References Cited

U.S. PATENT DOCUMENTS 6,320,624 B1 11/2001 Ayer et al.
8,323,198 B2 12/2012 Sui et al.
(Continued)

FOREIGN PATENT DOCUMENTS

WO 02/047031 A2 6/2002

OTHER PUBLICATIONS

Jan. 29, 2018 Search Report issued in European Patent Application No. 17190114.3.
(Continued)

*Primary Examiner* — Paul M Berardesca
(74) *Attorney, Agent, or Firm* — Oliff PLLC (57) ABSTRACT

There is disclosed a method for spatiotemporal registration between a first image stream and a second image stream. A first registration frame set derived from the first image stream and a second registration frame set derived from the second image stream are defined. A spatial correlation analysis is conducted based on the first registration frame set and the second registration frame set to determine a spatial registration offset. The first registration frame set and the second registration frame set are spatially registered based on the spatial registration offset. A temporal correlation analysis is conducted based on the first registration frame set and the second registration frame set after spatial registration to determine a temporal registration offset. The first image stream and the second image stream are spatially and temporally registered based on the spatial registration offset and the temporal registration offset.

18 Claims, 5 Drawing Sheets

(51) Int. Cl.
  *G06T 7/38* (2017.01)
  *H04N 13/296* (2018.01)
  *H04N 13/25* (2018.01)
  *G06T 7/194* (2017.01)
(52) U.S. Cl.
  CPC . *H04N 13/296* (2018.05); *G06T 2207/10021* (2013.01); *H04N 13/25* (2018.05)
(58) Field of Classification Search
  CPC ........ H04N 13/25; H04N 13/161; H04N 9/03; G06K 9/00758
  See application file for complete search history.

(56) References Cited

U.S. PATENT DOCUMENTS

| | | | |
|---|---|---|---|
| 9,076,201 B1 | 7/2015 | Negahdar et al. | |
| 2004/0006266 A1 | 1/2004 | Ustuner et al. | |
| 2010/0045809 A1* | 2/2010 | Packard | H04N 5/2258 348/222.1 |
| 2013/0070961 A1 | 3/2013 | Kia et al. | |
| 2015/0324656 A1* | 11/2015 | Marks | G01J 5/0025 383/103 |
| 2017/0078546 A1* | 3/2017 | Bezot | H04N 5/2258 |

OTHER PUBLICATIONS

Ferran Diego et al. "Joint Spatio-Temporal Alignment of Sequences". IEEE Transactions on Multimedia, IEEE Service Center, Piscataway, NJ, US, vol. 15, No. 6, Oct. 1, 2013, pp. 1377-1387.
Feb. 28, 2017 Search Report issued in British Patent Application No. 1615776.0.
Gang Wu et al. "Multi-Camera Spatio-Temporal Fusion and Biased Sequence-Data Learning for Security Surveillance".
Yaron Caspi et al. "Spatio-Temporal Alignment of Sequences". IEEE Transactions on Pattern Analysis and Machine Intelligence, vol. 24, No. 11, Nov. 2002, pp. 1409-1424.
Georgios Evangelidis et al. "Efficient Subframe Video Alignment Using Short Descriptors". IEEE Transactions on Pattern Analysis and Machine Intelligence, Institute of Electrical and Electronics Engineers, 2013, vol. 35, No. 10, pp. 1-15.
Yaron Ukrainitz et al. "Aligning Sequences and Actions by Maximizing Space-Time Correlations".
Flávio L.C. Pádua et al. "Linear Sequence-To-Sequence Alignment". IEEE Transactions on Pattern Analysis and Machine Intelligence, vol. 32, No. 2, Feb. 2010, pp. 304-320.

* cited by examiner

SPATIOTEMPORAL REGISTRATION OF IMAGE STREAMS

The present disclosure concerns the spatiotemporal registration of two image streams, for example video streams for two sensors directed at the same scene.

It is known to provide a variety of sensors for monitoring a scene, for example, certain vehicles such as watercraft and land vehicles may include infrared and visual sensors directed at a scene. Whilst such sensors may be co-located, they may be offset from one another and may have different orientations from one another. Their respective image streams may therefore be spatially misaligned. Further, unless special provision is made regarding sensor activation and timing, the image streams from such sensors may out of synchronisation (i.e. temporally misaligned).

Known methods of spatiotemporal registration are computationally expensive.

According to a first aspect there is provided a method for spatiotemporal registration between a first image stream and a second image stream, the method comprising: defining a first registration frame set derived from the first image stream and a second registration frame set derived from the second image stream; conducting a spatial correlation analysis based on the first registration frame set and the second registration frame set to determine a spatial registration offset; spatially registering the first registration frame set and the second registration frame set based on the spatial registration offset; conducting a temporal correlation analysis based on the first registration frame set and the second registration frame set after spatial registration to determine a temporal registration offset; and spatially and temporally registering the first image stream and the second image stream based on the spatial registration offset and the temporal registration offset.

Spatially registering the first registration frame set and the second registration frame set may comprise cropping non-overlapping regions of the first registration frame set and the second registration frame set.

The spatial registration offset may be determined based on a first composite derived from the first image stream and a second composite derived from the second image stream set.

The first composite may be a mean image based on a plurality of frames of the first image stream. The second composite may be a mean image based on a plurality of frames of the second image stream.

The first composite may correspond to a spatial sub-region of the first image stream, and the second composite may correspond to a spatial sub-region of the second image stream.

The spatial sub-region of the second image stream may be defined based on the spatial sub-region of the first image stream. For example, the two spatial sub-regions may have the same size and location relative the borders of the respective registration frame sets.

The method may further comprising: determining a primary static location in the first image stream corresponding to static image content of the first image stream; and defining the spatial sub-region of the first image stream based on the primary static location.

The spatial sub-region of the second image stream set may be defined based on the primary static location in the first image stream. The primary static location may be determined based on the first registration frame set. The primary static location may be determined by user input. The primary static location may be predetermined.

Determining the primary static location may comprise: computing a mean image based on a plurality of frames derived from the first image stream; determining the primary static location by feature extraction based on the mean image. The mean image may be computed based on a plurality of frames of the first registration frame set.

Determining the primary static location may comprise: defining a first plurality of frames derived from the first image stream and a second plurality of frames derived the first image stream relating to first and second sub-periods within a sampling period of the first image stream; computing two mean images corresponding to the first and second plurality of frames respectively; for each of the mean images, determining a plurality of static locations corresponding to static image content by feature extraction based on the respective mean image; and defining the primary static location based on comparing respective pairs of static locations in the mean images.

Each pair may comprise a static location in a first one of the two mean images, and corresponding static location in a second one of the two mean images. The first and second sub-periods may be consecutive.

Comparing respective pairs of static locations may comprise evaluating a separation distance between static locations of each respective pair. The primary static location may be defined by identifying a pair of static locations having a minimum separation distance from a plurality of pairs of static locations.

The primary static location may be determined based on the first image stream only. Accordingly, the primary static location may not be based on the second image stream. In other words, the primary static location may be defined based on the first image stream alone and without reference to the second image stream.

The method may further comprise identifying a set of dynamic pixel locations in the first registration frame set and/or the second registration frame set respectively for temporal correlation.

Conducting the temporal correlation analysis may comprise: for each of a plurality of temporal offset values, determining a correlation value for each dynamic pixel location based on the correlation between the first registration frame set and the second registration frame set when temporally registered based on the respective temporal offset value. The temporal correlation analysis may further comprise, for each of the plurality of temporal offset values, determining an average correlation value across the set of dynamic pixel locations; and determining the temporal offset value corresponding to maximum correlation between the first registration frame set and the second registration frame set based on the average correlation values.

The method may further comprise limiting the set of pixel locations to include pixel locations having a relatively high variance in correlation value and excluding pixel locations having a relatively low variance in correlation value, before determining the average correlation value across the set of dynamic pixel locations.

A variance parameter, such as standard deviation of correlation value, may be evaluated for each pixel location. Pixel locations may be determined to have a relatively high variance based on a ranking of pixel locations by the variance parameter, or by reference to a threshold variance parameter, for example. For example, pixel locations in the top 1% for variance may be included in the dynamic pixel set, and the remaining pixel locations may be excluded. In other examples, pixel locations having a variance parameter exceeding or equal to a threshold variance parameter may be included, and the remaining pixel locations excluded from the set of dynamic pixel locations.

Defining the first registration frame set and the second registration frame set may comprise downscaling a plurality of frames from the first image stream and the second image stream respectively so that there is a registration downscaling factor greater than one between the first and second image streams and the first and second registration frame sets.

For example, frames from the first image stream and the second image stream may be downscaled by a registration downscaling factor of 4.

The method may further comprise conducting at least one correction cycle, each correction cycle comprising: defining a first correction frame set derived from the first image stream and a second correction frame set derived from the second image stream so that there is a correction downscaling factor between the first and second image streams and the first and second registration frame sets respectively;

spatially and temporally registering the first correction frame set and the second correction frame set based on the spatial registration offset and the temporal registration offset; conducting a spatiotemporal correlation analysis based on the first correction frame set and the second correction frame set to correct the spatial registration offset and the temporal registration offset. The first image stream and the second image stream may be spatially and temporally registered after correction of the spatial registration offset and the temporal registration offset.

The correction downscaling factor may be one.

There may be at least two correction cycles, and wherein the correction downscaling factor reduces between successive correction cycles.

The spatiotemporal correlation analysis for the or each correction cycle may be based on respective spatial offset correction limits. For a first correction cycle the spatial offset correction limits may correspond to a maximum error bound related to the reduction from the registration downscaling factor to the correction downscaling factor. For any second or subsequent correction cycle, the spatial offset correction limits may correspond to a maximum error bound related to the reduction in the correction downscaling factor relative the previous correction cycle.

For example, in each registration or correction cycle, the spatial offset may have an error of up to 1 pixel. If the reduction in downscaling factor is from a downscaling factor of 4 to a downscaling factor of 2, the downscaling factor is thereby reduced by half and correspondingly the resolution is increased by a factor of 2. In this example, the maximum error bound may be two pixels of the correction frame set. By way of a further example, if the reduction in downscaling factor is by a third, then the maximum error bound may be three pixels of the correction frame set.

The first correction frame set may correspond to a spatial sub-region of the first image stream and the second correction frame set may correspond to a spatial sub-region of the second image stream.

For example, each sub-region may correspond to less than 50% of the area of the frame of the respective image stream, such as less than 30%, less than 20%, or less than 10%. Each sub-region may correspond to more than 4% of the area of a frame of the respective image stream. The spatial sub-region may be the same as a spatial sub-region defined for determining a primary static location.

According to a second aspect there is provided a vehicle comprising two sensors for monitoring a scene; an image processor configured to generate first and second image streams derived from the two sensors respectively, and a controller configured to spatiotemporally register the first and second image streams in accordance with the first aspect.

According to a third aspect there is provided a non-transitory machine-readable storage medium encoded with instructions which, when executed by a processor, cause the execution of a method in accordance with the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1A:
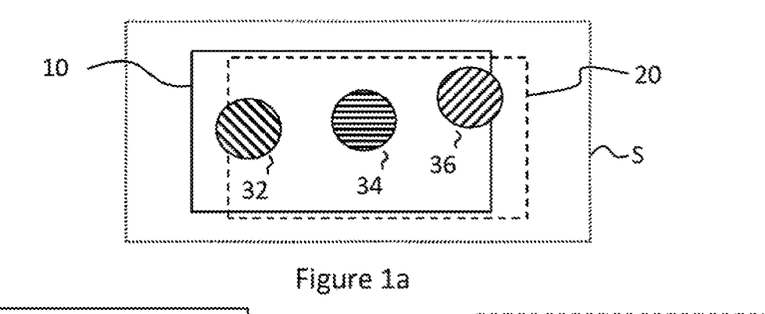
FIG. 1a schematically shows a scene monitored and two spatial windows associated with respective image sources.

FIG. 1a shows a scene S, for example a scene observed from a vehicle such as a watercraft. The scene includes first, second and third objects 32, 34, 36. A first spatial window 10 associated with a first image source extends over a portion of the scene S and a second spatial window 20 associated with a second image source extends over an overlapping portion of the scene S. In this example, the first and second spatial windows 10, 20 are rectangular, but in other examples they may be of any shape.

In an example, the first and second image sources may be sensors mounted on a vehicle, such as an infrared sensor and a visual sensor (i.e. a camera).

Figure 1B:
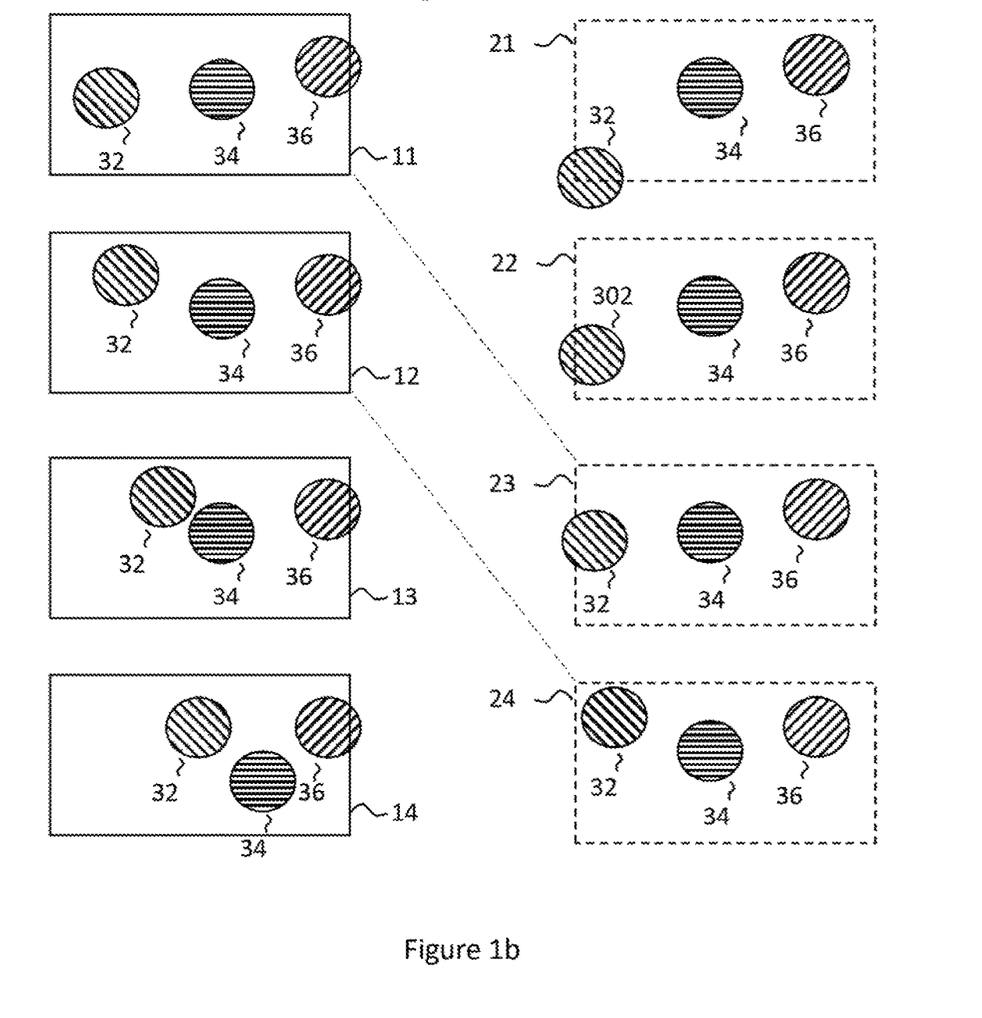
FIG. 1b schematically shows frames of the scene from first and second image sources

FIG. 1b shows two sets of four example frames 11-14, 21-24 from respective image streams derived from the respective image sources over a sampling period. The frames 11-14 of the first image stream relate to (have the same extent as) the first spatial window 10, whereas the frames 21-24 of the second image stream relate to the second spatial window 20.

As shown in FIG. 1b, the relative orientation of the three objects 32, 34, 36 changes from frame to frame. Further, the relative orientation of the three objects in the first frames 11, 21 of the respective image streams do not align with each other. In particular, the first object 32 appears lower in the first frame 21 of the second image stream. However, the three objects 32, 34, 36 appear to have a matching orientation in the first frame 11 of the first image stream and a third frame 23 of the second image stream, when accounting for the spatial offset between the first and second spatial windows 10, 20. Therefore, as shown in FIGS. 1a and 1b, the first and second image sources are directed at the scene such that the respective first and second image streams are both spatially and temporally offset with respect to one another.

Figure 2:
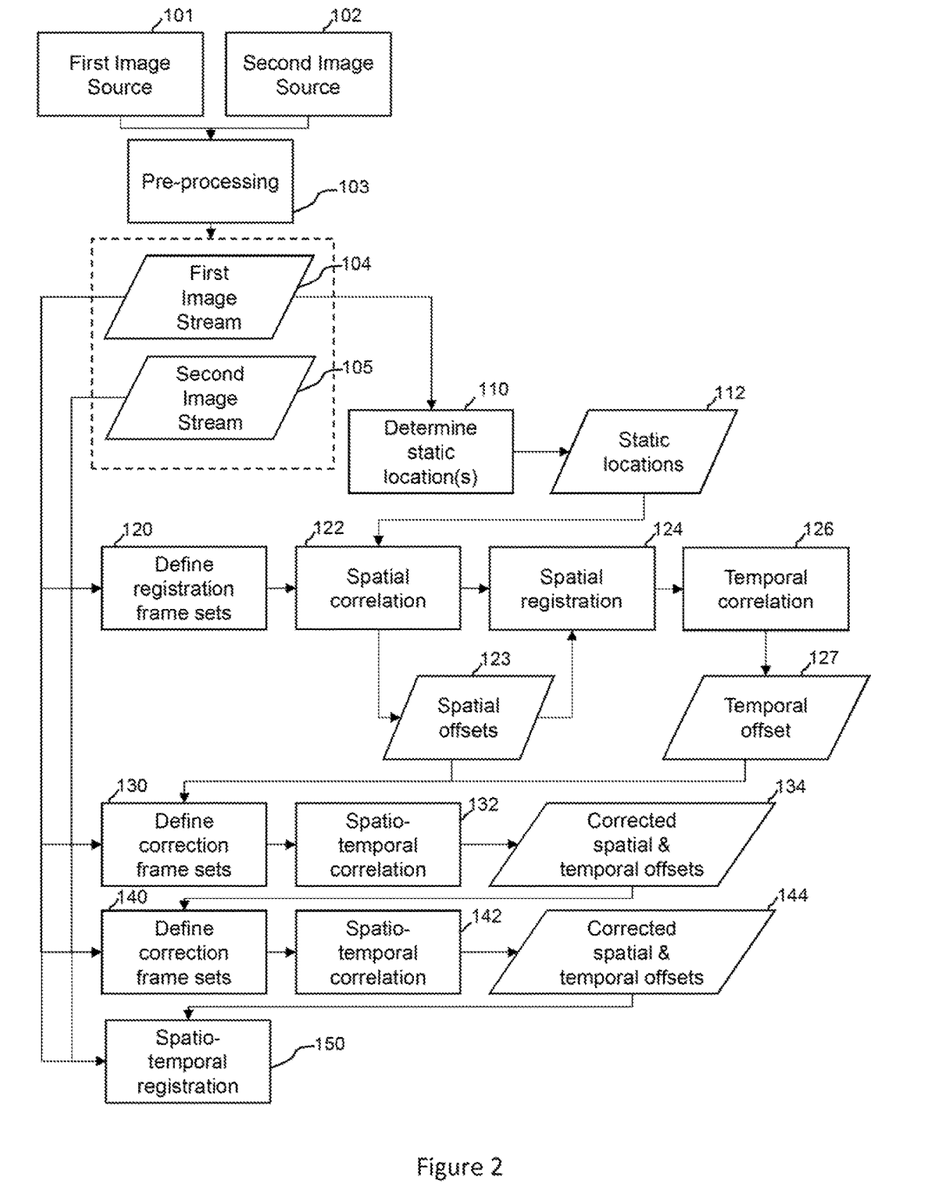
FIG. 2 is a flowchart showing a method of spatiotemporal registration.

FIG. 2 shows a method of spatiotemporally registering two image streams, and will be described with reference to the first and second image sources, image streams and the scene S of FIGS. 1a and 1b.

A first image source 101 and a second image source 102 are provided, which in this example are an infrared sensor and a visual sensor respectively. Each image source 101, 102 generates a video output.

The video outputs of the respective sources may have different properties to one another. For example, they may have different frame rates (e.g. 50 Hz and 60 Hz) and different resolutions (e.g. 1920×1080 pixels and 1280×720 pixels). Further, the image sources may have different optical properties. For example, the respective focal lengths of the image sources may be different from one another (e.g. 50 mm and 35 mm). Further, owing to different mounting positions, there may be a parallax error or optical discrepancy between the two spatial windows 10, 20 directed at the scene. In block 103 the video outputs from the first image source 101 and the second image source 102 are processed to generate two respective image streams 104, 104 having comparable properties. For example, using known image and video processing techniques, the video outputs can be upscaled or downscaled respectively so that the two image streams 104, 105 have the same resolution. Further, video interpolation may be used to achieve a common frame rate. Image correction techniques may be used to compensate for optical discrepancies such as difference in focal length.

As shown in FIG. 2, after determining the first and second image streams 104, 105, the spatiotemporal registration comprises four computational main stages as are shown in rows within the Figure, including: determining static locations; initial spatial and temporal registration; and two stages of correcting spatio-temporal registration, as will be described in detail below.

In block 110, static locations within the first image stream 110 are determined. In an example, a plurality of frames within a sampling period (for example the sampling period associated with the four frames 11-14 of FIG. 1*b*) are selected and a composite image is formed of the frames. The composite image may be an average image formed by averaging intensity values for each pixel of the respective frames. This may be considered the digital equivalent to a "long exposure" image. Accordingly, features represented in the image which remain static within the spatial window 10 remain are shown in the composite image as they are in each respective frame (i.e. they may be clearly represented), whereas moving features may appear blurred and overlap one another. Static locations within the composite image (i.e. locations corresponding to stationary features in the scene S) can therefore be determined based on feature extraction techniques, such as edge detection. Various paramaters may be used to determine which locations are strongly correlated to stationary features. For example, one such parameter may be contrast at an edge, such that a primary static location may be determined as from a plurality of identified static locations based on it having the highest contrast at a respective edge.

Figure 3:
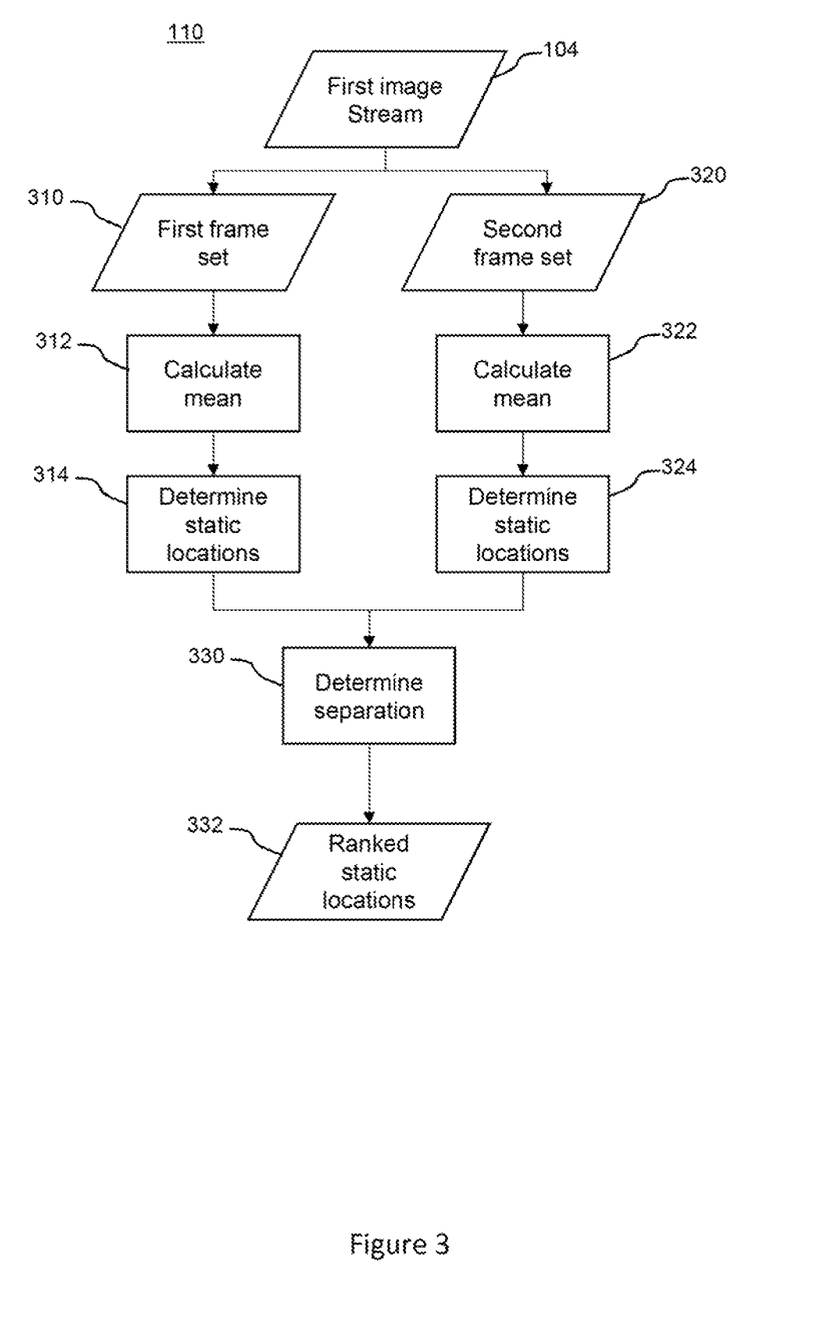
FIG. 3 is a flowchart for determination of a static location.

FIG. 3 shows a particular example sub-method 110 for determining a plurality of static locations and determining a primary static location. In particular, a set of frames from the first image stream 104 corresponding to a sampling period (such as the sampling period for the four frames 11-14 of FIG. 1*b*) are divided into a first frame set 310 and a second frame set 320 corresponding to adjacent sub-periods within the sampling period. A composite image (or "mean image") is computed 312, 322 based on each of the first frame set and second frame set respectively. A plurality of static locations are determined 314, 324 using feature extraction techniques as described above, with respect to each composite image.

In block 330, corresponding pairs of static locations across the two mean images are determined, and the separation distance for each pair is determined. The separation distance may be determined based on the location of the centroid of each static location in the respective composite images. The pair of static locations with the minimum separation distance may be determined as a primary static location. The plurality of pairs of static locations may be ranked 332 according to their respective separation distances to form a series of static locations Si.

By splitting the sampling period into two sub-periods, the sub-method 110 is able to select static locations relating to features in the scene S that remain substantially stationary throughout the sampling period, whilst ranking locations that are only stationary for a lesser period of the sampling period lower. For example, with reference to the four frames 11-14 of FIG. 1*b*, it can be observed that the second object 34 is stationary for three frames 11-13 but moves to a new location in the fourth frame 14. In contrast, the third object 36 remains stationary for all four frames 11-14. Accordingly, if each sub-period corresponds to two frames (in this simplified example), the separation distance for the third object 36 will be substantially zero whereas the separation distance for the second object will be positive.

Referring back to FIG. 2, the static locations 112 are stored in memory. In this example they are stored as correlated by their ranking, such that a primary static location may be readily determined.

In the next stage, initial spatial and temporal registration offsets are determined, as follows. In block 120, first and second registration frame sets are determined based on the first and second image streams. In this example, the first and second registration frame sets correspond to the frames of the first and second image stream over the sampling period used for determining the static locations (for example, the sampling period corresponding to the four frames shown in FIG. 1*b*) downscaled by a downscaling factor of 4 (i.e. having a resolution 0.25 that of the first and second image streams). In other examples, a different sampling period, such as a shorter or longer overlapping sampling period may be used).

The registration frame sets are downscaled relative the first and second image streams to reduce computational expense of spatial and temporal registration, as will be described below.

In block 122, spatial correlation analysis is conducted to determine spatial offsets between the first and second registration frame sets (and thereby offsets for the first and second image streams 104, 105). In this example, a first composite image corresponding to the first registration frame set and a second composite image corresponding to the second registration frame set are determined as described above. A spatial sub-window of each composite image is extracted surrounding the location of the primary static location in the first image stream. In other examples, the respective registration frame sets may be processed to crop respective frames to the spatial sub-window, and composite images of the respective cropped frames formed.

Spatial correlation is conducted based on the two composite images corresponding to the spatial sub-window. Spatial correlation (otherwise known as phase correlation or digital image correlation) may be done based on such techniques as are known in the art, for example by computing a pixel-wise multiplication of the Fourier transforms of the two composite images, followed by taking the absolute value of the inverse Fourier transform of the result at each pixel. The output of the spatial correlation is the spatial offsets in two dimensions (i.e. X and Y directions for a two-dimensional image), which are stored in memory 123.

By performing spatial correlation analysis based on a downscaled image and a spatial sub-window of the registration frame sets, the spatial correlation analysis can be conducted at low computational expense.

In block 124, the first and second registration frame sets are spatially registered based on the spatial offsets 123. In this example, spatial registration comprises cropping non-overlapping portions of the first and second registration frame sets accordingly, such that the spatially-registered registration frame sets relate to the same spatial window.

In block 126, temporal correlation is conducted based on the spatially-registered first and second registration frame sets. In an example, temporal correlation analysis may be conducted based on temporally offsetting the two registration frame sets and determining correlation between them based on evaluating a correlation parameter for each pixel value.

A further example of temporally correlation will be described below with respect to FIG. 4, in which temporal correlation analysis is limited to pixel locations corresponding to dynamic features of the scene to minimise computational expense and improve accuracy.

The spatially-registered first and second registration frame sets 410, 420 are determined as described above. In blocks 412 and 422, a temporal standard deviation of a pixel property is determined for each pixel of the respective registration frame sets. In this example, for each pixel location in each respective frame set the standard deviation of intensity is determined over all the frames of the frame set. For an intensity-only image source, the intensity may be the monochrome brightness of the respective pixel. For a color camera (or a trichromatic camera), the intensity may be the intensity or luminosity channel (V) of the hue-saturation-luminosity (HSV) colour space. Accordingly, pixel locations which relate to stationary features in the scene S result in a zero or relatively low temporal standard deviation, whereas pixel locations which (at least partly) relate to moving features over the sampling period of the respective frame set result in a higher temporal standard deviation. It will be appreciated that the temporal standard deviation, determined for each pixel location in each of the first and second registration frame sets 410, 420 may be considered a metric of how much the intensity at the respective pixel location changes during the sampling period.

In block 430, the temporal standard deviation is cross-multiplied between the first and second registration frame sets 410, 420 at each pixel location. For example, the temporal standard deviation for a pixel location on the $50^{th}$ row and $20^{th}$ column of the (spatially-registered) first registration frame set 410 is multiplied with the temporal standard deviation for the corresponding pixel location of the second registration frame set 420 (i.e. the pixel location on the $50^{th}$ row and $20^{th}$ column of the second registration frame set). By cross-multiplying the values of temporal standard deviation, pixel locations for which there are changes in intensity during the sampling period in both the first and second registration frame sets can be identified.

In this example, in block 432 a set of dynamic pixel locations (i.e. those considered to relate to non-stationary features in the scene S) is identified based on the cross-multiplied temporal standard deviation. In particular, the 1% of pixel locations having the highest value of cross-multiplied temporal standard deviation are identified and included in the set of dynamic pixel locations. The remaining 99% of pixel locations are excluded.

In block 434, a temporal correlation analysis is conducted based on the set of dynamic pixel locations for a plurality of different temporal offsets within a temporal offset window. For example, the temporal offset window may be 1 second and there may be 41 temporal offsets from −1 second to 1 second at 0.05 second intervals (i.e. every frame when the frame rate is 20 Hz). Any number of different correlation analyses could be used. In this example, a correlation analysis is conducted to determine a correlation value for each pixel location for each of the respective temporal offsets, wherein each correlation value relates to the similarity or correlation between a pixel property, such as intensity, between the first registration frame set and the second registration frame set when temporally registered by the respective temporal offset value. In this example, a relatively high correlation value relates to a close similarity or correlation, whereas a relatively low correlation value indicates that the two registration frame sets are not similar (when offset by the respective temporal offset).

The applicant has found that temporal correlation can be performed, and may be most accurate, when the analysis is limited to those parts of a scene where the objects are moving (i.e. dynamic pixel locations). However, the applicant has also found that some pixel locations within the set of dynamic pixel locations having relatively high correlation values may relate to random-movement features within the scene. Such random-movement features may include, for example, moving water or edges of relatively stationary objects (i.e. objects that remain nearly still).

In block 436, a variance parameter is determined for each pixel location relating to the variance of the correlation value at the respective pixel location over the temporal window. In this particular example, the variance parameter is the standard deviation of the correlation value. The applicant has found that pixel locations relating to random-movement features may have a relatively constant correlation value across the temporal window, whereas pixel locations relating to moving objects in the scene may generally have a peak correlation value at a particular temporal offset which reduces sharply away from the respective temporal offset. Accordingly, the variance parameter (standard deviation of correlation value, in this example) can be used to distinguish between moving objects and random-movement features of the scene.

In block 438, the set of dynamic pixel locations is amended to include the 1% of dynamic pixel locations having the highest variance parameters (i.e. relating to a relatively high variance in correlation value over the temporal window) and exclude the remaining 99% of the originally-identified pixel locations.

In block 440, an average correlation value is determined across the modified set of dynamic pixel locations (from heron in, the set of dynamic pixel locations) for each temporal offset value. In block 442, the temporal offset value which results in the peak average correlation value across the set of dynamic pixel locations is determined to be the temporal offset for registration. In particular, since the two image streams relate to recordings of the same scene, an average correlation value should peak at the appropriate temporal offset for temporal registration.

Referring back to FIG. 2, the temporal offset 127 is recorded in memory.

In third and fourth stages of the example spatiotemporal registration method, the initial spatial and temporal registration is corrected to mitigate the effect of downscaling of the first and second registration frame sets. In this example, the registration frame sets are downscaled by a factor of 4, as mentioned above.

In block 130, two correction frame sets are defined based on the first image stream 104 and the second image stream 105 respectively using a reduced downscaling factor relative the downscaling factor used for the first and second registration frame sets. In this example, the two correction frame sets are defined in block 130 based on a downscaling factor of 2, and are registered based on the spatial registration offset 123 and the temporal registration offset 127.

The maximum spatial offset error is considered to be 1 pixel of the registration frame sets, which corresponds to four pixels (in a 2×2 matrix) of the correction frame sets. Accordingly, a spatial offset limit for correction of the spatial registration based on the first and second correction frame sets is limited, in this example, to +1-2 pixels.

In this example, a temporal offset error is estimated to be within a predetermined temporal window, such as a window corresponding to between 2 and 4 frames. In this example, the temporal offset limit for the spatiotemporal correlation analysis is set based on the temporal offset error (e.g. it may be set at 4 frames). The temporal offset limit may be estimated based on previous temporal offset errors as determined when conducting spatiotemporal conduction for corresponding reductions in downscaling factor.

In block 132, a spatiotemporal correlation analysis is done based on the spatial and temporal offset limits for correction. In this example, the spatiotemporal correlation analysis is a three-dimensional analysis optimising over two spatial dimensions and the temporal dimension. Whilst such an analysis may be computationally expensive when conducted for initial registration, since the spatial offset for correction are extremely limited based on the maximum error bound of the previous registration stage, and also because the temporal offset is expected (or limited) to be small, the computation can be done relatively inexpensively.

In this example, the spatiotemporal correlation analysis is conducted based on a spatial sub-region of the respective correction frame sets. Alternatively, the respective correction frame sets may be defined to correspond to a spatial sub-region of the first and second image streams. For example, the spatial sub-region may represent 50% or less of a full-size frame, 30% or less, 20% or less. The spatial sub-region may represent at least 4% of a full-size frame. The spatial sub-region may be the same sub-region as used for spatial registration analysis. Otherwise, the spatial sub-region may be selected to include dynamic features (or dynamic and static features), or may be predetermined or selected at random. By conducting the spatiotemporal correlation analysis based on a spatial sub-region, the spatiotemporal correction may be conducted more efficiently.

In block 134, the corrected spatial and temporal offsets 134 are output to memory.

The correction stage 130, 132, 134 is then repeated with modified parameters for a fourth stage of the spatiotemporal registration method 140, 142, 144. In block 140, first and second correction frame sets are re-defined based on the first and second image streams 104, 105 respectively and using a reduced downscaling factor, which in this particular example is a factor of 1 (i.e. no downscaling relative the first and second image streams 104, 105). The first and second correction frame sets are spatially and temporally registered using the corrected spatial and temporal offset 134 stored in memory from the first correction stage.

In block 142, three-dimensional spatial correlation analyses is conducted as described above to determine new corrected spatial and temporal offsets 144 that are stored in memory. As will be appreciated, the maximum spatial error bound from the first stage of correction is 1 pixel of the correction frame sets of the first stage of correction, which corresponds to 2 pixels of the correction frame sets for the second stage of correction. The spatial offset limit for the spatiotemporal correlation analysis is set to 2 pixels accordingly.

In block 150, the corrected spatial and temporal offsets 144 from the second stage of correction are used to register the first and second image streams 104, 105. It will be appreciated that the spatial and temporal offsets may also be used to register the original or other derived outputs of the first and second image sources.

Figure 5:
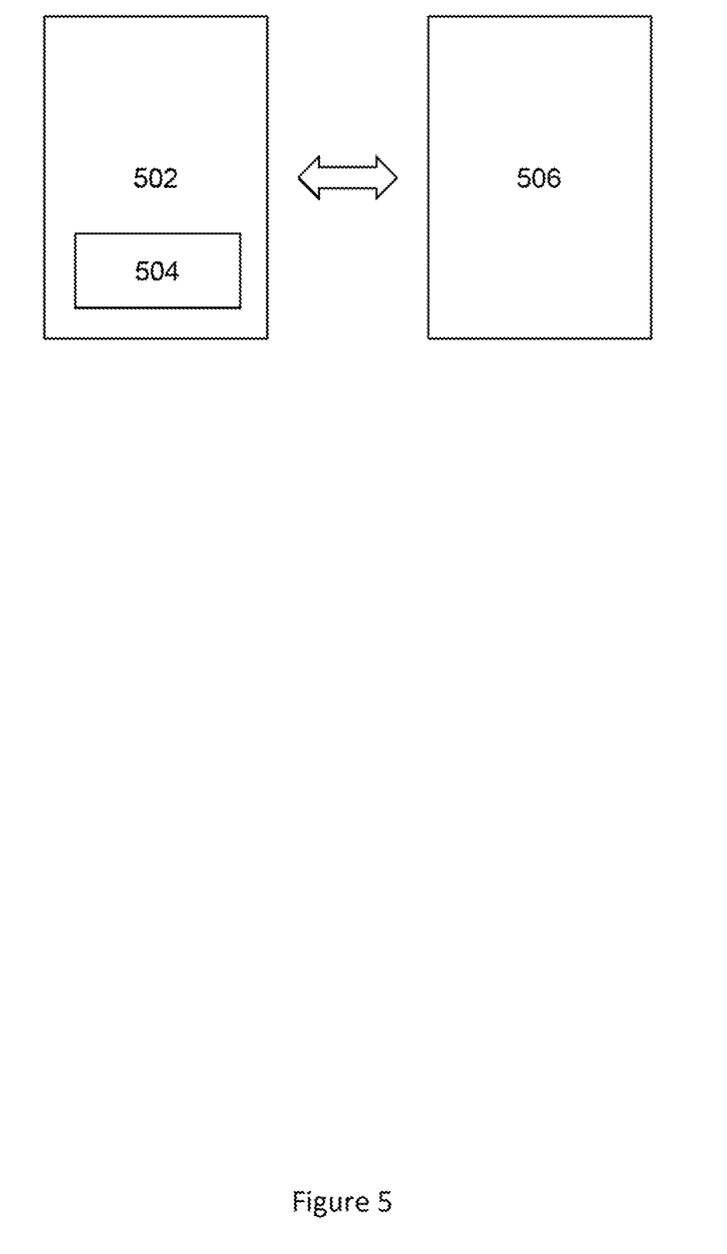
FIG. 5 shows a machine-readable medium and processor.

FIG. 5 shows a non-transitory machine-readable medium 502 encoded with instructions 504, which, when executed by a processor 506 cause the execution of a method of spatiotemporal registration as described above.

Although two correction stages have been described above, it will be appreciated that in other examples there may be zero, one or more than two correction stages.

Although examples have been described in which spatial offset limits and temporal offset limits are predetermined, it will be appreciated that spatial offset limits may be determined based on a manual input. For example, this may be appropriate if an operator has sufficient information to make an estimate of a maximum spatial or temporal offset.

Although an example has been described in which the temporal offset limit for spatiotemporal correlation analysis is predetermined or determined based on previous data, it will be appreciated that in other examples, the temporal offset may be determined differently. In some examples, frames may be downsampled for initial registration and early correction stages. For example, for a 48 Hz image stream there would be 48 frames per second. Every fourth frame may be used for initial registration to result in a downsampled effective frame rate of 12 Hz. For a first correction stage, every other frame may be used, such that there is a downsampled effective frame rate of 24 Hz. For a second correction stage, all frames may be used. The temporal offset limit may be set based on the maximum temporal error bound resulting from the reduction in downscaling (i.e. from 12 Hz to 24 Hz the maximum temporal error bound may be plus or minus 2 frames).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

It will be appreciated that the methods described herein with respect to FIGS. 1-4 may be at least partly implemented in a computer, such as a general purpose computer, or in an apparatus comprising a controller configured to implement the methods.

An example computer or controller may include at least one processor and at least one memory. The memory may store a computer program comprising computer readable instructions that, when ready by the processor, causes the performance of at least one of the methods described herein with respect to FIGS. 2 to 4. The computer program may be software or firmware, or may be a combination of software and firmware.

The processor may include at least one microprocessor and may comprise a single core processor, may comprise multiple processor cores (such as a dual core processor or a quad core processor), or may comprise a plurality of processors (at least one of which may comprise multiple processor cores).

The memory may be any suitable non-transitory computer (or machine) readable storage medium, data storage device or devices, and may comprise a hard disk and/or solid state memory (such as flash memory). The memory may be permanent non-removable memory, or may be removable memory (such as a universal serial bus (USB) flash drive).

Figure 4:
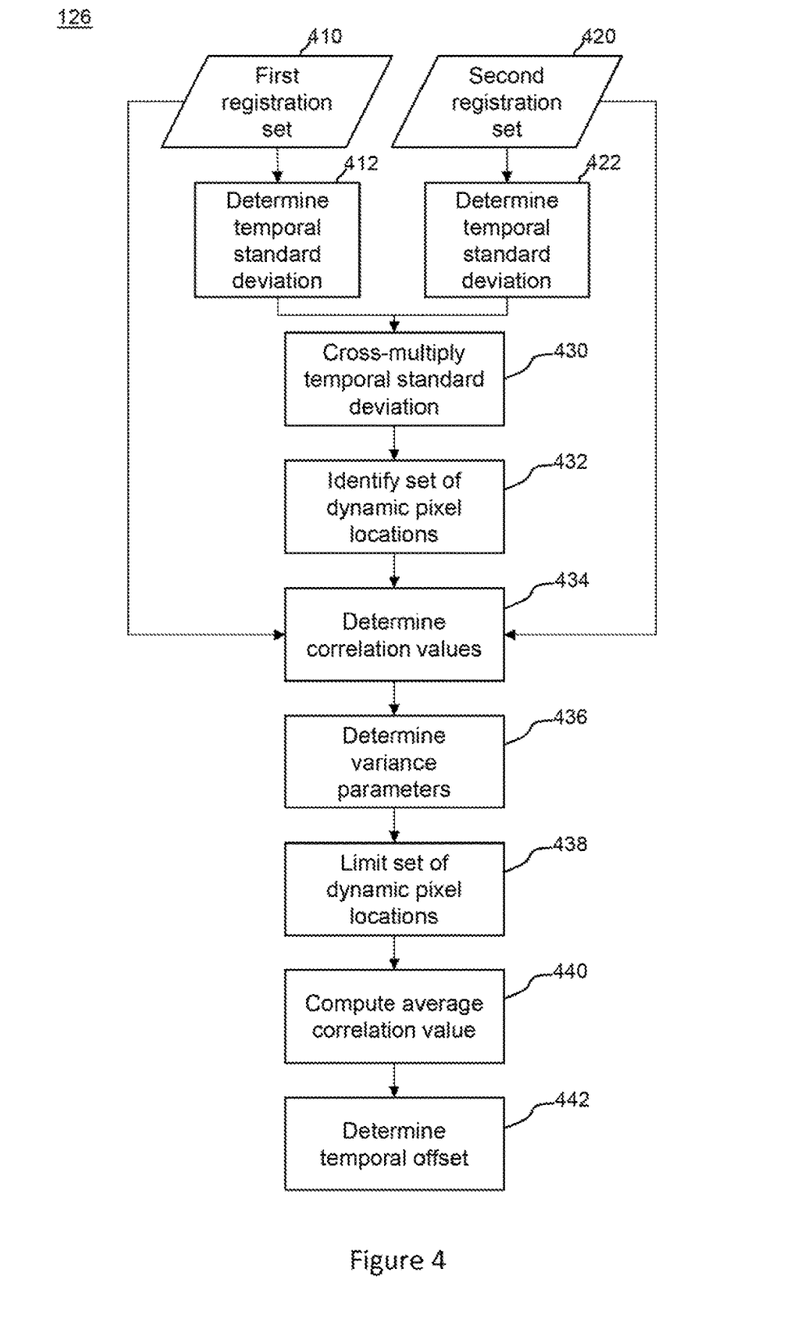
FIG. 4 is a flowchart showing temporal registration.

As shown in FIG. 5, a non-transitory machine readable storage medium 502 may be provided including machine-readable instructions 504 (or a computer program) executable by a processor 506 to cause performance of at least one of the methods described herein with respect to FIGS. 2 to 4. The machine-readable instructions may be transferred from the non-transitory machine-readable storage medium 502 to a memory of a controller or computer. The non-transitory machine-readable storage medium 502 may be, for example, a USB flash drive, a compact disc (CD), a digital versatile disc (DVD) or a Blu-ray disc. In some examples, the machine-readable instructions may be transferred to a memory via a wireless signal or via a wired signal.

Further, the machine-readable instructions or computer program may be transmitted by a signal that, when executed by a processor, causes the performance of at least one of the methods described herein with respect to FIGS. 2 to 4.

The invention claimed is:

1. A method for spatiotemporal registration between a first image stream and a second image stream, the method comprising:
   defining a first registration frame set derived from the first image stream and a second registration frame set derived from the second image stream;
   conducting a spatial correlation analysis based on the first registration frame set and the second registration frame set to determine a spatial registration offset;
   spatially registering the first registration frame set and the second registration frame set based on the spatial registration offset;
   conducting a temporal correlation analysis based on the first registration frame set and the second registration frame set after spatial registration to determine a temporal registration offset; and
   spatially and temporally registering the first image stream and the second image stream based on the spatial registration offset and the temporal registration offset, wherein:
   the first registration frame set includes a plurality of images, and the second registration frame set includes a plurality of images.

2. A method according to claim 1, wherein the spatial registration offset is determined based on a first composite derived from the first image stream and a second composite derived from the second image stream set.

3. A method according to claim 2, wherein the first composite corresponds to a spatial sub-region of the first image stream, and wherein the second composite corresponds to a spatial sub-region of the second image stream.

4. A method according to claim 3, further comprising:
   determining a primary static location in the first image stream corresponding to static image content of the first image stream; and
   defining the spatial sub-region of the first image stream based on the primary static location.

5. A method according to claim 4, wherein determining the primary static location comprises:
   computing a mean image based on a plurality of frames derived from the first image stream;
   determining the primary static location by feature extraction based on the mean image.

6. A method according to claim 4, wherein determining the primary static location comprises:
   defining a first plurality of frames derived from the first image stream and a second plurality of frames derived from the first image stream relating to first and second sub-periods within a sampling period of the first image stream;
   computing two mean images corresponding to the first and second plurality of frames respectively;
   for each of the mean images, determining a plurality of static locations corresponding to static image content by feature extraction based on the respective mean image;
   defining the primary static location based on comparing respective pairs of static locations in the mean images.

7. A method according to claim 6, wherein comparing respective pairs of static locations comprises evaluating a separation distance between static locations of each respective pair;
   wherein the primary static location is defined by identifying a pair of static locations having a minimum separation distance from a plurality of pairs of static locations.

8. A method according to claim 4, wherein the primary static location is determined based on the first image stream only.

9. A method according to claim 1, further comprising identifying a set of dynamic pixel locations in the first registration frame set and/or the second registration frame set respectively for temporal correlation.

10. A method according to claim 9, wherein conducting the temporal correlation analysis comprises:
    for each of a plurality of temporal offset values, determining a correlation value for each dynamic pixel location based on the correlation between the first registration frame set and the second registration frame set when temporally registered based on the respective temporal offset value;
    for each of the plurality of temporal offset values, determining an average correlation value across the set of dynamic pixel locations;
    determining the temporal offset value corresponding to maximum correlation between the first registration frame set and the second registration frame set based on the average correlation values.

11. A method according to claim 10, further comprising limiting the set of pixel locations to include pixel locations having a relatively high variance in correlation value and excluding pixel locations having a relatively low variance in correlation value, before determining the average correlation value across the set of dynamic pixel locations.

12. A method according to claim 1, wherein defining the first registration frame set and the second registration frame set comprises downscaling a plurality of frames from the first image stream and the second image stream respectively so that there is a registration downscaling factor greater than one between the first and second image streams and the first and second registration frame sets.

13. A method according to claim 12, further comprising conducting at least one correction cycle, each correction cycle comprising:
    defining a first correction frame set derived from the first image stream and a second correction frame set derived from the second image stream so that there is a correction downscaling factor between the first and second image streams and the first and second registration frame sets respectively;

spatially and temporally registering the first correction frame set and the second correction frame set based on the spatial registration offset and the temporal registration offset; and conducting a spatiotemporal correlation analysis based on the first correction frame set and the second correction frame set to correct the spatial registration offset and the temporal registration offset; and wherein the first image stream and the second image stream are spatially and temporally registered after correction of the spatial registration offset and the temporal registration offset.

14. A method according to claim 13, wherein there are at least two correction cycles, and wherein the correction downscaling factor reduces between successive correction cycles.

15. A method according to claim 13, wherein the spatiotemporal correlation analysis for the or each correction cycle is based on respective spatial offset correction limits; and wherein for a first correction cycle the spatial offset correction limits correspond to a maximum error bound related to the reduction from the registration downscaling factor to the correction downscaling factor; and wherein for any second or subsequent correction cycle, the spatial offset correction limits correspond to a maximum error bound related to the reduction in the correction downscaling factor relative the previous correction cycle.

16. A method according to claim 13, wherein the first correction frame set corresponds to a spatial sub-region of the first image stream and the second correction frame set corresponds to a spatial sub-region of the second image stream.

17. A vehicle comprising two sensors for monitoring a scene; an image processor configured to generate first and second image streams derived from the two sensors respectively, and a controller configured to spatiotemporally register the first and second image streams in accordance with claim 1.

18. A non-transitory machine-readable storage medium encoded with instructions which, when executed by a processor, cause the execution of a method in accordance with claim 1.

* * * * *